May 17, 1927.
O. J. SALISBURY
1,628,747
CONTINUOUS PROCESS OF TREATING OILS
Filed April 11, 1924
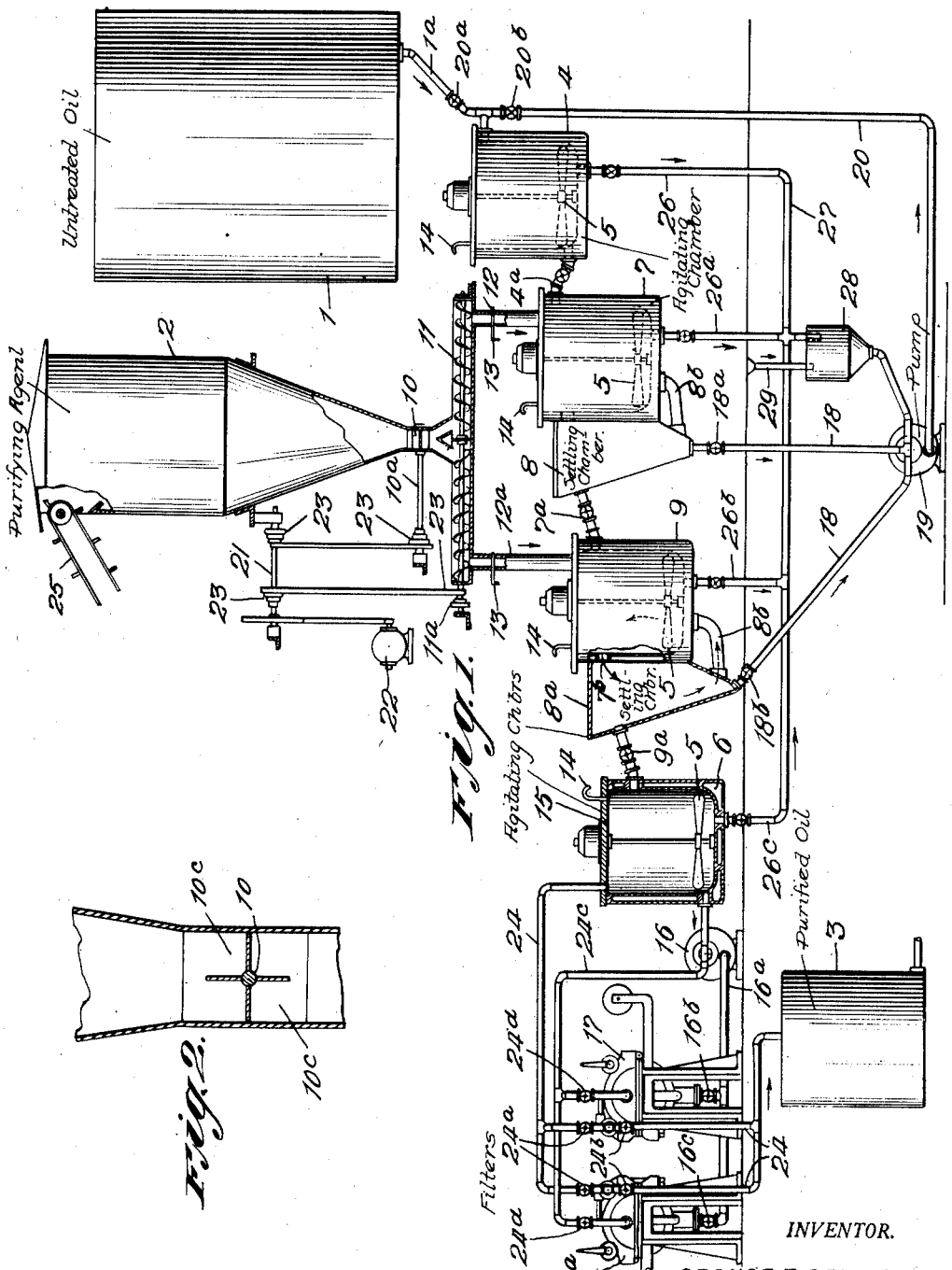
INVENTOR.
ORANGE J. SALISBURY
BY
ATTORNEYS.

Patented May 17, 1927.

1,628,747

UNITED STATES PATENT OFFICE.

ORANGE J. SALISBURY, OF SALT LAKE CITY, UTAH.

CONTINUOUS PROCESS OF TREATING OILS.

Application filed April 11, 1924. Serial No. 705,763.

This invention relates to a process and apparatus for treating oils and other liquids for the purpose of bleaching, clarifying and decolorizing the same.

It is the objection of the invention to provide a continuous treating process, and an apparatus for carrying out the same, whereby the oil or other liquid being treated passes in a continuous flow from the supply tank through the treating apparatus and into the storage tank for the finished product and whereby the oil is continuously treated in small quantities at a plurality of points along its path of travel. By providing a process and apparatus of this kind, I am able to treat a larger amount of oil in a given time, with smaller outlay for labor, power consumption and equipment than is possible with the oil treating apparatus and processes now in use.

Another object of the invention is that by providing means at certain points in the process for withdrawing portions of the unspent treating materials from the liquid being treated and returning the same to an earlier point in the process a considerable economy in the amount of treating materials used is effected.

Another object of the invention is to provide an automatic apparatus for treating oils or other liquids by my process whereby when the proper amount of the treating material for a particular liquid has been determined, the process will proceed automatically, the proper amount of treating material being added at the proper time, thereby insuring a uniform quality for the final product and reducing the amount of supervision required for the treatment.

Another object of the invention is to provide an apparatus wherein the treatment can, if desired, be carried out entirely in closed chambers, under pressure and preventing access of the atmosphere and oxidization of the oil or liquid being treated.

In the drawing, Fig. 1 is a part-sectional diagrammatic view of one form of the apparatus whereby the principles of the invention may be practiced. Fig. 2 is a sectional view of the feeding and measuring valve 10 taken at right angles to Fig. 1.

The accompanying drawings illustrate, in a part-sectional diagrammatic view, one form of apparatus whereby the principles of the invention may be practiced.

In the drawings 1 indicates a suitable storage tank for the liquid being treated, 2 is a hopper for containing the treating materials, which may be clay, fuller's earth, activated carbon, bone char or various compounds and 3 is the storage tank for the purified or treated liquid. From the tank 1 a pipe 1ª extends to the first mixing chamber 4 which is provided with an agitating apparatus 5 driven from any suitable source and adapted to set up a violent agitation of the oil or other liquids in the chamber. The walls of the chamber 4 may be hollow to permit a steam jacket around the oil as indicated at 6 in the sectional view of the chamber 15 for the purpose of keeping the oil or other liquid at the desired treating temperature. From the bottom of the chamber 4, a pipe 4ª conducts the oil into the chamber 7 constructed similar to the chamber 4 and also provided with an agitator 5.

From the chamber 7 an opening 7ᵇ leads into an enlarged compartment 8 of sufficient size to reduce the velocity of the oil therein and to permit a portion of the treating material which has been added to the oil to settle to the bottom of the compartment while the retarded oil, carrying with it a large portion of the treating material, flows from the top of the settling chamber through the pipe 7ª into the chamber 9 also provided with an agitator 5 and a settling compartment 8ª.

From near the bottom of the settling chambers 8 and 8ª a return pipe 8ᵇ extends to the bottom of the agitation chambers 7 and 9 so that the oil may be continuously circulated through the chamber 7 or 9, compartment 8 or 8ª and return pipe 8ᵇ to insure uniform mixing with the clay or treatment material, while at the same time the oil is in continuous circulation between the storage tank 1 and the final tank 3.

The hopper 2 for the clay or other treating material is preferably located above the chambers 7 and 9 and means are provided to feed the treating material from the hopper 2 into each of the chambers 7 and 9.

In the present embodiment of the invention this means comprises an automatic measuring and feeding valve 10 divided into quadrants 10ᶜ adapted to feed the treating materials in measured amounts to the right and left worm conveyor 11 which extends from below the hopper 2 over each of the compartments 7 and 9. The vertical extensions 12 and 12ª conduct the treating material from the ends of the conveyor 11 into the respective chambers. Suitable slide valves 13 in the extensions 12 and 12ª permit the flow of treating materials to the chamber 7 or 9 to be checked or cut off at will.

From the top of the settling compartment 8ª of the chamber 9, the oil flows through the pipe 9ª into the last agitation chamber 15 and from there it is forced by the pump 16 through the filters 17 and 17ª to separate the purified oil from the treating material and the oil is conducted to the tank 3.

From the bottom of the settling compartments 8 and 8ª, pipes 18 extend to a suitable pump 19 which is adapted to receive the settled treating material, together with a small amount of the oil from the compartments 8 and 8ª and pump the settled material through the pipe 20 back into the agitation chamber 4 where it will be mixed with the fresh oil from the tank 1. Suitable valves 20ª and 20ᵇ are provided to control the flow of the crude oil and of the returned treating materials into the chamber 4.

To provide a uniform rate of feed of the treating materials from the hopper 2 into the chambers 7 and 9 the shaft 10ª of the valve 10 and the shaft 11ª of the conveyor 11 are driven from the same power shaft 21 which may be driven from any suitable source of power, as for example, an electric motor 22.

Change speed pulleys 23 on the shaft 21 and on the shafts 10ª and 11ª permit the rate of feed from the hopper 2 to be changed at will so as to correspond with the rate of flow of the oil through the apparatus or the time necessary for the treatment of any particular oil or other liquid. By throttling or opening the valves 18ª and 18ᵇ in the pipes 18 leading from the bottom of the settling compartment 8 and 8ª the amount of the treating material returned to the chamber 4 may be controlled and by adjusting the speed of the valve 10 and conveyor 11, any desired quantity of the bleaching material may be added so that when once set the entire process is continuous and automatic and as the treatment material is automatically added in measured amounts the quality of the final product is much more uniform than where the attendant is relied upon to measure and add the treating material.

The filters 17 and 17ª may be of any suitable type such as is shown in the patent to E. J. Sweetland No. 1,313,929, granted August 26, 1919. For example, the pipe 16ª from the pump 16 to the filters is provided with valves 16ᵇ and 16ᶜ so that the oil may be forced through either filter while the other is being cleaned.

Pipes 24 extend from the outlet of the filters to the tank 3 and to the treating chamber 15 and are provided with valves 24ª and 24ᵇ so that the oil from the filters, if not sufficiently treated, may be directed back into the chamber 15 for further treatment and refiltration or may be directed into the tank 3. A pipe 24ᶜ, provided with suitable valves 24ᵈ, extends from the filter back to the pump 16 so that the oil may be passed a second time through the filters if not properly clarified by the first passage.

A bucket elevator 25 is provided for elevating the clay, fuller's earth, carbon or other treating material into the hopper 2, and in cases where the filter cake from the filters 17 and 17ª may be reused, the lower end of the elevator 25 may be located near the point where the filter cake is discharged from the filters so as to convey the discharged cake back into the hopper 2.

Drainage pipes 26, 26ª, 26ᵇ and 26ᶜ extend from the agitation chambers into the manifold 27 which discharges into a receptacle 28 communicating with the pump 19 so that if it becomes necessary to drain the agitation chambers the oil therein may be pumped back into the chamber 4 or the storage tank.

The floor drain 29 also communicates with the receptacle 28 so that any oil which is spilled during the treating operations may be recovered and pumped back to the head of the system. Suitable valves may be provided in the pipes between each of the agitation chambers and in the drainage pipes for controlling the flow of oil through these pipes.

Vent pipes 14 extend through the covers of each of the agitation chambers, if desired.

If desired one or more of the agitation chambers may be provided with means for forcing a gaseous treating medium through the oil therein as is described in my co-pending application Serial No. 701,624 filed March 25, 1924. By violently agitating portions of the treating material with the oil in the various chambers and continuously circulating the same through the agitation and settling compartments and by returning part of the treating material to the head of the system I have found it possible to secure a saving of substantially twenty per cent in the amount of bleaching material which it has heretofore been necessary to use to bleach certain oils to the desired color.

The continuous circulation unit consisting of an agitation chamber, settling chamber and return pipe has been described only in connections with chambers 7 and 9 however it could also be applied to chambers 4 and 15, or any number of additional agitating chambers, with or without settling chambers, could be added to the system.

While the invention has been described with particular reference to the treatment of oil, it will be understood that any other liquid may be treated therein. It is also to be understood that the invention is not limited to the particular details of the apparatus described therein but that various modifications and changes may be made therein without departing from the spirit of the invention or the scope of the appended claims.

I claim:

1. The process of treating oil or other liquid for the purpose of bleaching or refining the same, which comprises flowing the liquid into a chamber, adding partially spent treating material thereto and mixing the liquid and treating material, flowing the mixture into another chamber, adding fresh treating material, agitating the mixture and continuously circulating a portion of the mixture between said chamber and another chamber where a portion of the treating material is separated from the liquid and returned to the initial treating chamber, while the remaining mixture is passed on to a filtering means and filtered to separate the liquid from the impurities and remaining treating material.

2. The process of treating oil or other liquid for the purpose of bleaching or refining the same, which comprises flowing the liquid in a continuous stream through a plurality of treating chambers, adding measured portions of the treating material in different chambers, agitating the liquid and treating material in the different chambers and simultaneously circulating the liquid in closed paths in certain of the chambers while allowing a portion of the treating material to settle out of the mixture, returning the separated treating material to an earlier treating chamber, and finally filtering the purified liquid from the impurities and remaining treating material.

3. In an apparatus for treating oil or other liquids, a storage tank, a plurality of treating chambers, means to flow the liquid from the storage tank through the chambers, means to add the treating material to the liquid in the chambers, means in the chambers to agitate the contents thereof, a settling chamber between the chambers to permit a portion of the treating material to settle out of the agitated liquid, means to return the settled portion to an earlier treating chamber, means beyond the last treating chamber to separate the treated liquid from the impurities and treating material and means to drain the treating chambers and return the drained liquid to the storage tank.

4. In an apparatus of the type described, a tank for the liquid to be treated, a plurality of agitating chambers, settling tanks communicating with each of said chambers, means to flow the oil to be treated through said chambers and tanks, means for introducing treating material into each of said chambers, means to circulate the mixture in each chamber in a cycle between said chambers and said settling tanks, means to filter the oil coming from the last of said settling tanks, and means to draw off a portion of the partially used treating material from each settling tank and introduce it into the untreated oil.

5. In an apparatus of the type described, a plurality of treating chambers comprising agitating portions and settling portions, means to continuously flow the liquid to be treated through said treating chambers, means to introduce treating material into each of said treating chambers, means to thoroughly mix the materials in the agitating portion of each treating chamber and to cause the material in each treating chamber to circulate between the agitating portion and the settling portion of the treating chamber in the same direction as the flow of the liquid therethrough, and means to draw off a portion of the settled treating material from the settling portion of each treating chamber and return the same to the first treating chamber.

6. In an apparatus for treating oil or other liquid, a storage tank, a plurality of treating chambers including an agitation chamber, and a settling chamber, a receiving tank, means to flow the liquid in a continuous stream from the storage tank through the treating chambers into the receiving tank, means to add a treating material to the liquid in the chambers, means in the chambers to agitate the contents thereof, means in the treating chambers for flowing the oil in a continuous circuit through the agitation chamber and settling chamber portion of the treating chambers to allow part of the treating material to settle out of the agitated liquid, means to return the settled portion to an earlier treating chamber and means beyond the last treating chamber to separate the treated liquid from the impurities and treating material.

In testimony whereof I have affixed my signature to this specification.

ORANGE J. SALISBURY.